Figures 1, 2:
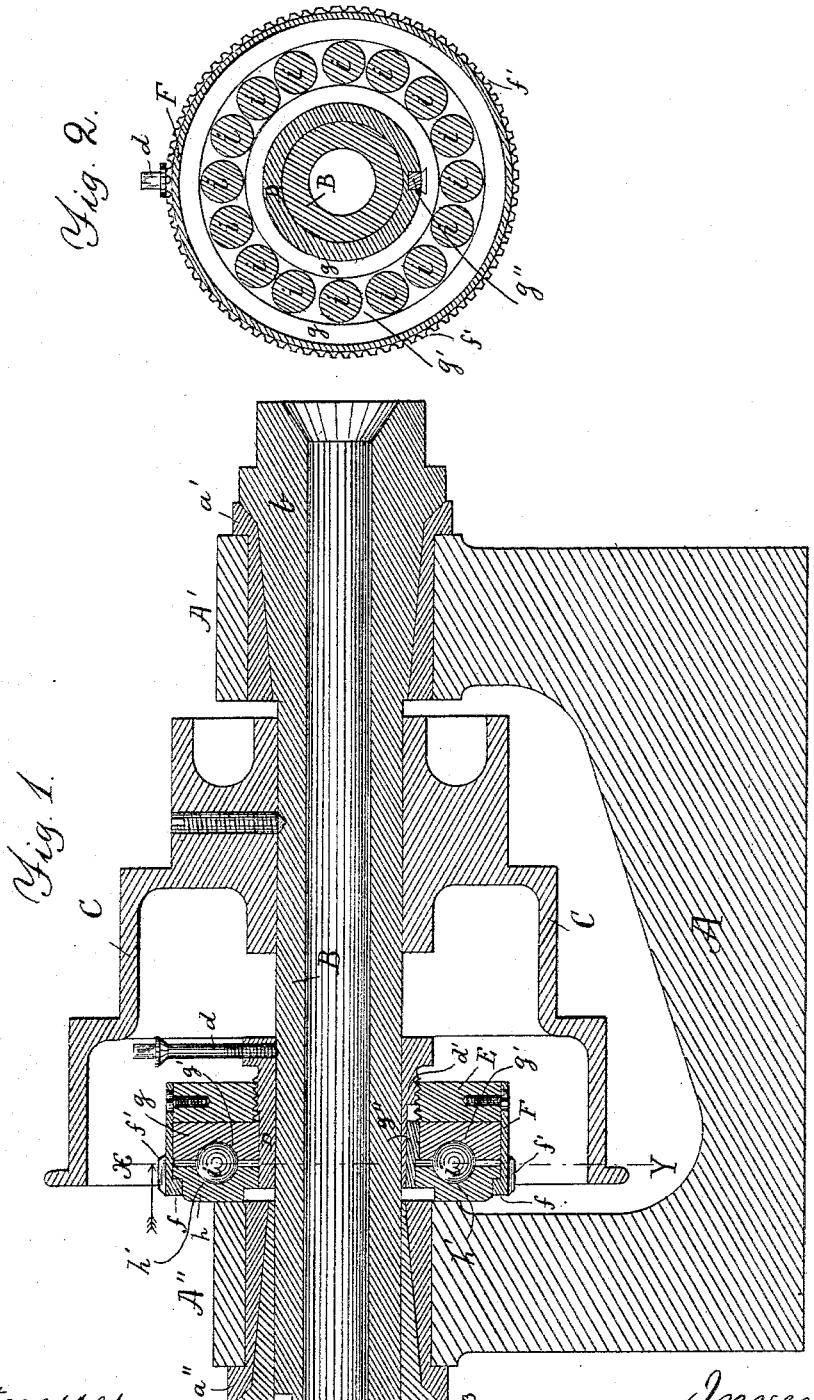

(No Model.)

J. STARK.
ANTI-FRICTION ADJUSTABLE BEARING FOR LATHE SPINDLES.

No. 388,927. Patented Sept. 4, 1888.

Witnesses.
Selma R. Schelin.
Henry Chadbourn.

Inventor.
John Stark.
by Alban Andrew, his atty.

UNITED STATES PATENT OFFICE.

JOHN STARK, OF WALTHAM, MASSACHUSETTS.

ANTI-FRICTION ADJUSTABLE BEARING FOR LATHE-SPINDLES.

SPECIFICATION forming part of Letters Patent No. 388,927, dated September 4, 1888.

Application filed June 13, 1888. Serial No. 276,992. (No model.)

*To all whom it may concern:*

Be it known that I, JOHN STARK, a citizen of the United States, and a resident of Waltham, in the county of Middlesex and State of Massachusetts, have invented new and useful Improvements in Anti-Friction Adjustable Collars for Lathe-Spindles, of which the following, taken in connection with the accompanying drawings, is a specification.

This invention relates to an anti-friction adjustable collar for lathe-spindles, and it is carried out as follows, reference being had to the accompanying drawings, where—

Figure 1 represents a central longitudinal section of a lathe head-stock having its spindle provided with my invention, and Fig. 2 represents a cross-section on the line X Y shown in Fig. 1.

Similar letters refer to similar parts wherever they occur on the different parts of the drawings.

The object of this invention is to prevent heating of the lathe-spindle and its front bearing and to relieve the end-pressure on the latter when the lathe-spindle is used for drilling purposes, and this I do by means of an anti-friction adjustable collar secured to the lathe-spindle between its bearings and adapted to lie in contact with the front end of the rear bearing of the head-stock as long as the lathe is used for drilling purposes, and I thus transfer the longitudinal pressure on the lathe-spindle directly to the flat surface of the rear bearing, by which arrangement and construction the desired results are obtained.

A is the head-stock of a lathe, having the upwardly-projecting front and rear bearings, A' and A'', as usual. $a'$ and $a''$ are the usual tapering hardened-steel bearing-sleeves in said respective bearings, as shown in Fig. 1.

B is the hollow lathe-spindle, having tapering forward enlarged end $b$, journaled in the front bearing-sleeve, $a'$, and adapted to receive a chuck or face plate, as is usual in machines of this kind.

$a^3$ is the usual tapering metal sleeve, secured to the rear end of the lathe-spindle B and fitting in the correspondingly-shaped sleeve-bearing, $a''$, in which it is journaled, as shown in Fig. 1.

$b'$ is a nut screwed on the rear end of the hollow lathe-spindle B, as usual.

C is the cone-pulley, secured in a suitable manner to the lathe-spindle B between the front and rear bearings of the head-stock, as shown in Fig. 1. For the purpose of reducing the frictional resistance between the tapering head $b$ of the lathe-spindle and the interior of the tapering bearing-sleeve $a'$, I use an anti-friction adjustable collar on the lathe-spindle, which is constructed as follows:

To the lathe-spindle B, I secure in an adjustable manner, preferably by means of a set-screw, $d$, the annular sleeve D, having near its forward end an external screw-thread, $d'$, on which is longitudinally adjustable the screw-threaded nut or cylindrical plate E, to which is secured the annular case or shell F, provided at its rear end with an inwardly-projecting annular lip or flange, $f$, as shown in Fig. 1.

$f'$ represents serrations on the periphery of the shell or case F, for the purpose of enabling the operator to turn the said shell F and its nut E by hand in adjusting the device, as will hereinafter be more fully described.

Within the shell F, between the rear portion of the nut E and front edge of the annular flange $f$, are located the anti-friction ball-bearing plates $g$ and $h$, having on their abutting faces the respective annular grooves $g'$ and $h'$, in which are laid loosely the metal balls or rolls $i\ i\ i$, as shown in the drawings.

The plate $g$ is splined on the sleeve D by means of the key $g''$, secured to the said plate $g$ and working in a longitudinal groove made in said sleeve D, as shown in the drawings, by which arrangement the plate $g$ partakes of the rotary motion of the sleeve D, but is longitudinally adjustable thereon, as shown. The plate $h$, however, is not splined to the sleeve D, but is loosely journaled on the latter, so that the shell F, nut E, sleeve D, and plate $g$ may be rotated without imparting a rotary motion to said plate $h$. The operation is as follows: In using the device the sleeve D is secured to the hollow spindle B by means of the set-screw $d$ in such a manner that the plate $h$ shall be a little distance off or free from the forward end of the rear bearing, A''.

If it is now desired to use the rotary spindle B for drilling purposes, I adjust the nut E relative to the sleeve D by turning the shell F and its said nut until the rear of the plate $h$ is brought in contact with the front end of the rear bearing, A″, as shown in Fig. 1, when the longitudinal pressure on the spindle B will be transferred to the rear bearing, A″, and the anti-friction collar. During the rotation of the spindle B the nut E, sleeve D, the shell F, and the grooved anti-friction plate $g$ will rotate with shaft B, while the plate $h$ will be held stationary against the forward end of the rear bearing, A″, by the frictional resistance between said parts being much greater than between the plates $g$ and $h$ and their intermediate anti-friction balls or rollers, $i\ i$. The longitudinal pressure on the sleeve $a'$ is thus relieved, and the spindle B may be rotated without much frictional resistance. If the lathe is to be used for ordinary turning purposes, the improved collar is not needed, and the plate $h$ is therefore moved slightly away from the end of the rear bearing, A″, which is accomplished simply by turning the shell F and nut E around the sleeve D and its screw-threaded portion $d'$.

What I wish to secure by Letters Patent, and claim, is—

1. In combination with the head-stock of a lathe and its spindle, an adjustable anti-friction collar secured to the lathe-spindle and having anti-friction balls or rollers located between grooved plates, one of which is connected to the lathe-spindle and the other loose thereon, substantially as and for the purpose set forth.

2. In combination with the lathe spindle B and its head-stock, the adjustable anti-friction collar, as described, consisting of the externally-screw-threaded sleeve D, secured to the spindle B, the nut E and its shell F, longitudinally adjustable thereon, and the anti-friction plates $g\ h$, with their balls or rollers $i\ i$, constructed and arranged substantially as and for the purpose set forth.

3. The adjustable anti-friction collar for lathe-spindles, as described, consisting of a pair of grooved plates, $g\ h$, and the anti-friction rolls or balls $i$, an inclosing-shell, F, and nut E, secured to the same, combined with a screw-threaded sleeve, D, splined to one of the said grooved plates, substantially as and for the purpose set forth.

In testimony whereof I have signed my name to this specification, in the presence of two subscribing witnesses, on this 11th day of June, A. D. 1888.

JOHN STARK.

Witnesses:
BRADSHAW S. TOLMAN,
CHARLES A. WHITMEY.